United States Patent [19]

Derman

[11] 3,813,102

[45] May 28, 1974

[54] LOCKING AND SEALING RING

[75] Inventor: Karl Gustav Einar Derman, Partille, Sweden

[73] Assignee: Forsheda Ideutveckling AB, Varnamo, Sweden

[22] Filed: Mar. 29, 1972

[21] Appl. No.: 239,188

[30] Foreign Application Priority Data

Nov. 12, 1971  Sweden............................... 14476/71
Mar. 29, 1971  Sweden............................... 4026/71

[52] U.S. Cl.................... 277/9, 277/235, 308/187.1
[51] Int. Cl.......................... F16j 15/32, F16c 33/78
[58] Field of Search ....... 277/9, 101, 139, 227, 235, 277/1, 189, 65; 292/307, 308, 309; 308/36.1, 187.1, 187.2

[56] References Cited

UNITED STATES PATENTS 3,028,203  4/1962  Lund et al. ...................... 308/187.1
3,306,223  2/1967  Liebig................................ 277/65
3,382,567  5/1968  Schaeffler............................ 277/1

FOREIGN PATENTS OR APPLICATIONS 593,874  5/1959  Italy....................................... 277/9

Primary Examiner—Louis R. Prince
Assistant Examiner—Robert I. Smith
Attorney, Agent, or Firm—Albert L. Jeffers; Roger M. Rickert

[57] ABSTRACT

A locking and sealing device, especially for sealing between concentric surfaces while locking a bearing to at least one of the surfaces in which a ring element, preferably of metal, has a sealing element connected thereto with the ring element arranged for locking engagement with a cylindrical surface while the sealing ring sealingly engages the same surface and projects radially therefrom for sealing engagement with the other surface whereby a seal is established between the surfaces while a bearing engaging the cylindrical surface is locked in place by the ring element.

5 Claims, 13 Drawing Figures

LOCKING AND SEALING RING

The present invention relates to a locking and sealing device especially for use in connection with locking a bearing in position and for sealing the space at one end of the bearing.

In a great many devices, a shaft is disposed in a housing and an antifriction bearing supports the shaft within the housing. It is usually desirable to seal between the shaft and the housing and also to fix the bearing against axial movement relative to at least one of the housing and the shaft. Separate locking devices and seals are known and are widely used for this purpose and in using such devices separate operations are required to place the locking device in position and to place the seal into position.

Having the foregoing in mind, the primary object of the present invention is the provision of a locking and sealing device in which the locking device and sealing device can be inserted in an assembly of the aforesaid nature as a unit.

Another object of the invention is the provision of a locking and sealing device of the nature referred to which can be arranged to lock on either an inwardly facing surface or on an outwardly facing surface.

A still further object of the present invention is the provision of a locking and sealing device which can be utilized to form a closure member for closing an aperture in a housing.

The foregoing objects as well as still other objects and advantages of the present invention will become more apparent upon reference to the following detailed specification taken in connection with the accompanying drawings in which.

BRIEF SUMMARY OF THE INVENTION

According to the present invention, a locking device is provided in the form of a ring element adapted for lockingly engaging a cylindrical surface. The ring element may be in the form of a snap ring adapted to set in an annular groove formed in the surface and which surface may face radially inwardly or radially outwardly. Connected to the ring element, as by vulcanization, is a rubber-like sealing element, formed of an elastic rubber or rubber-like material, and which sealingly engages the same surface to which the ring element is locked.

The sealing element may extend radially and engage a surface coaxial with the surface engaged by the ring element and thereby seal between the surfaces or the sealing element may be in the form of a disc when the ring element engages an inwardly facing surface whereby the locking and sealing device can be made in the form of a closure cap.

In another form which the device can take, the ring element is provided with circumferentially spaced radial fingers which engage the surface which the ring element is to engage in a locking manner so that the fingers will deflect when the ring element is pushed into place, thereby locking the ring element to the surface. This last mentioned ring element is also adapted for either internal or external cylindrical surfaces.

DETAILED DESCRIPTION OF THE INVENTION

Figure 1:
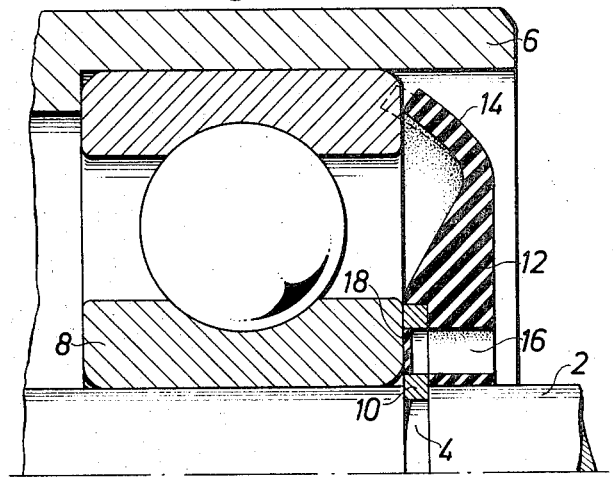
FIG. 1 is a fragmentary section showing a ball bearing in a housing and supporting a shaft with the bearing fixed to the shaft and sealed to the shaft and housing by a sealing and locking device according to the present invention.
Figure 1A:
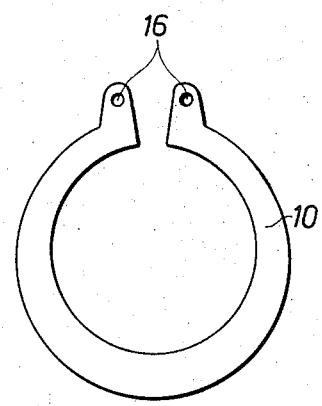
FIG. 1a shows the locking ring portion of the device of FIG. 1.

In FIG. 1, reference number 2 designates a shaft in which a groove 4 has been formed. Between the shaft 2 and a housing 6, there is disposed a conventional ball type antifriction bearing 8. A locking ring 10 of the type shown in FIG. 1a, namely a snap ring, is arranged in the groove 4. A rubber-like sealing element 12, also in the form of a ring, is connected to ring 10. The peripheral portion of ring 12 is provided with a sealing lip 14 axially engaging the outer race of the antifriction bearing 8.

When mounting the locking ring 10, the ends of the ring are separated by means of a tool engaging openings 16 disposed in the ends of the ring in order to increase the diameter of the ring so that it can be slipped over the shaft 2 and snapped into the groove 4. In this position of ring 10, the inner edge portion of the sealing ring 12 is pressed into sealing engagement with the portion of shaft 2 adjacent the groove 4. The sealing ring 12 is preferably manufactured and vulcanized to the locking ring 10 in one and the same operation. During this operation, a thin layer 18 of the rubber-like material of ring 12 closes the openings 16. The ring described with reference to FIG. 1 is a so called outer locking ring.

Figure 2:
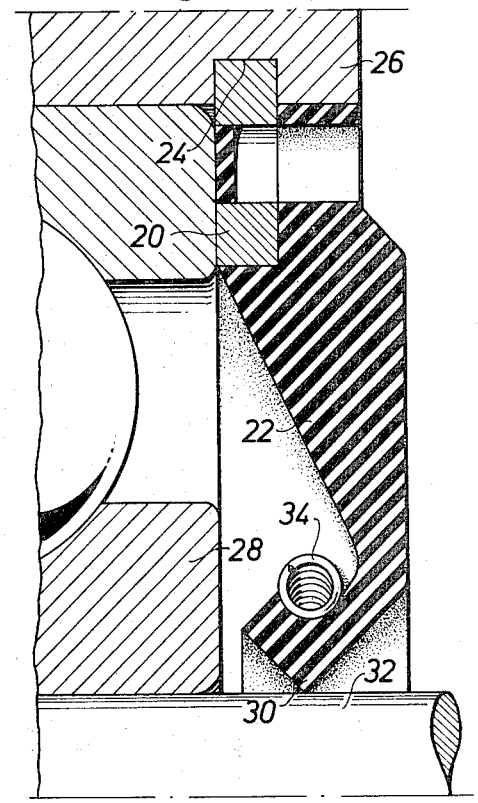
FIGS. 2 through 5 are sections similar to FIG. 1 but showing different embodiments of the locking and sealing device.

In FIG. 2, there is shown an inner locking ring 20 having a resilient rubber-like sealing element 22 connected thereto. In the embodiment shown in FIG. 2, a groove 24 is formed in the housing 26. The object of the seal is to prevent oil from leaking out from the space occupied by bearing 28. To this end, the sealing element 22 comprises a sealing lip 30 engaging the shaft 32 adjacent bearing 28. The lip 30 is resiliently pressed against the shaft 32 by means of an annular spring 34.

Figure 3:
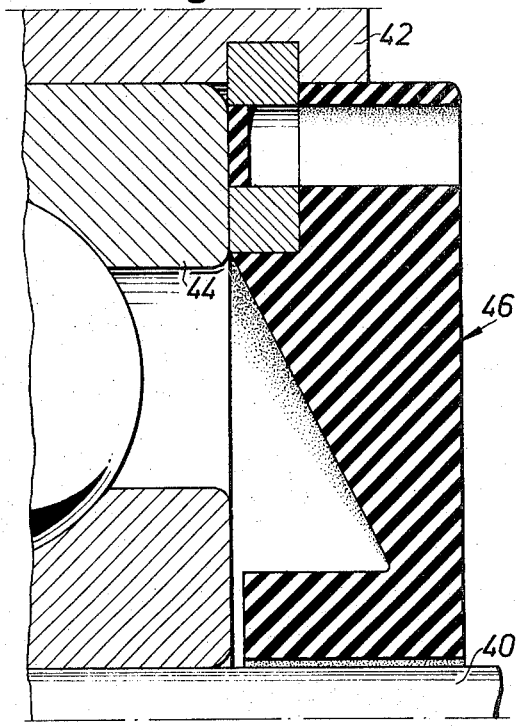

In FIG. 3, there is shown a shaft 40 rotatably mounted in a housing 42 by means of a bearing 44. The bearing 44 is axially fixed and the shaft is sealed in relation to the housing by means of a locking and sealing device 46 in accordance with the invention. Device 46 has a snap ring portion engaging a groove in the housing and a rubber-like seal element fixed to the snap ring portion and extending radially inwardly to shaft 40.

Figure 4:
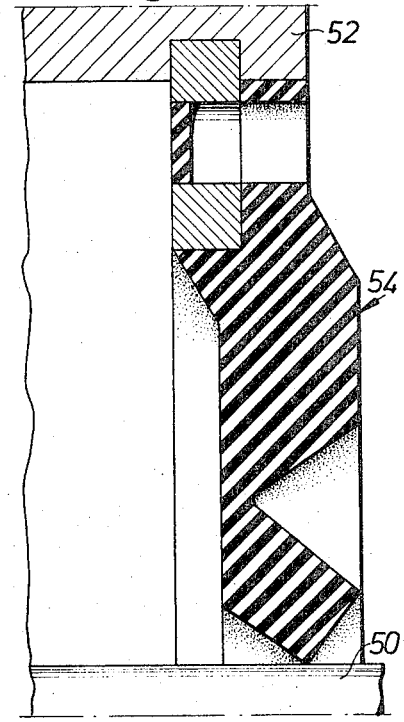

In FIG. 4, there is shown a shaft 50 rotatably mounted in a housing 52 by means of a bearing (not shown). The shaft 50 and the housing 52 are sealed in relation to each other by means of a locking and sealing device 54 in accordance with the invention similar to that of FIG. 3 but having an inclined lip which engages shaft 50.

Figure 5:
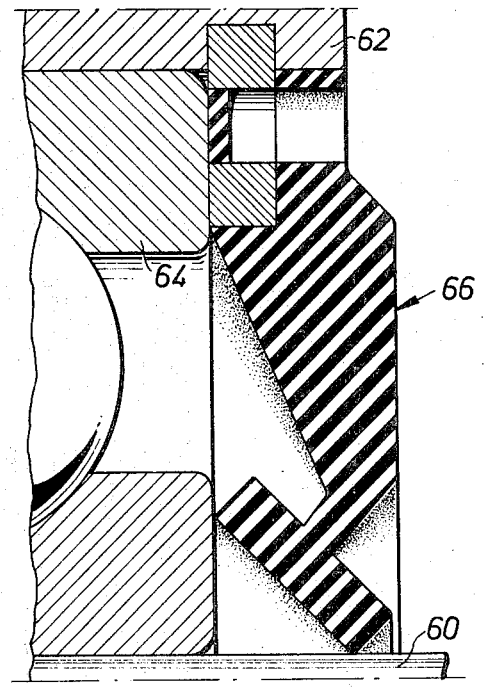

In FIG. 5, there is shown a shaft 60 rotatably mounted in a housing 62 by means of a conventional bearing 64. The bearing 64 is axially fixed and the shaft is sealed in relation to the housing by means of a locking and sealing device 66 in accordance with the present invention. The sealing element portion of the device 66 has an inclined portion at the radially inner side which bridges between the inner race of bearing 64 and shaft 60.

Figure 6:
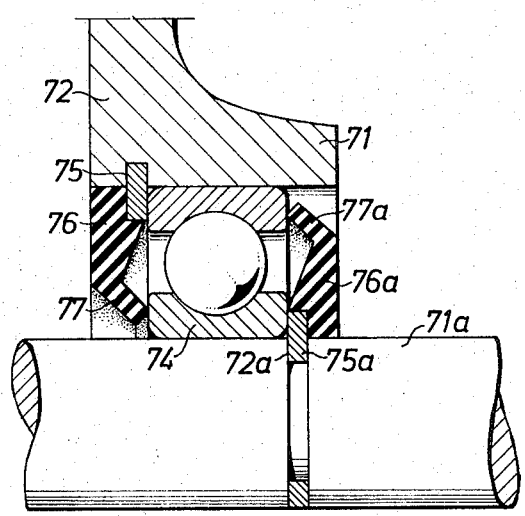
FIGS. 6 and 7 are sections showing still different embodiments of the invention wherein sealing and locking devices are disposed on both sides of a bearing.

FIG. 6 is a section through a bearing arrangement for a shaft. This view shows the upper part of the right hand side of the bearing arrangement. On the left hand there is a similar bearing arrangement inverted in relation to the arrangement shown in the drawing. In an outer machine element, or housing, 71 an axially inner locking ring 75 is seated in a groove 72 in element 71.

As described above, a rubber-like sealing ring 76 is vulcanized to the locking ring 75. The rubber-like sealing ring is provided with a sealing lip 77 inclined so as axially to engage the inner race of the bearing 74.

At the axially outer side of the bearing, there is a similar arrangement comprising a locking ring 75a provided with a rubber-like sealing ring 76a. The sealing ring has a lip 77a inclined so as axially to engage the outer race of bearing 74 and preventing grease from leaking out from and dirt from leaking into the bearing. The locking ring 75a is disposed in a groove 72a in the shaft 71a.

Figure 7:
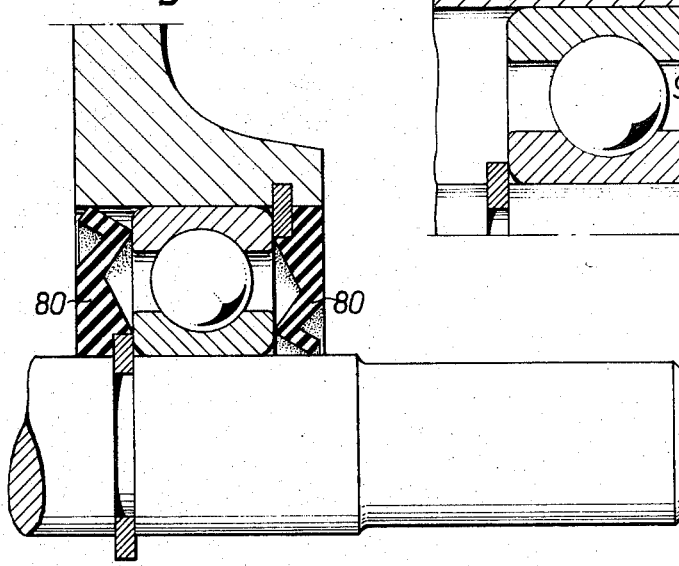

FIG. 7 shows a section through a sealing arrangement different from the sealing arrangement shown in FIG. 6 only in respect of the design of the sealing elements 80 of the locking and sealing rings. Sealing elements 80 will be seen to comprise inclined regions at the free ends thereof.

Figure 8:
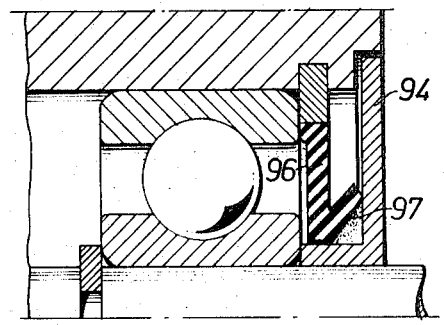
FIG. 8 is a sectional view showing an arrangement wherein a protective ring is provided for protecting the sealing and locking device.
Figure 9:
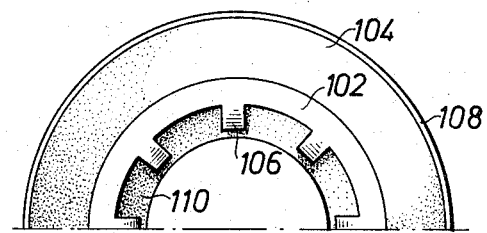
FIG. 9 is a view showing a sealing and locking device according to the present invention wherein the ring element of the device is provided with radial fingers.

In the sealing arrangement shown in FIG. 8, the sealing element engages an additional element 94. A sealing lip 97 of the sealing element 96 engages the element 94 in the axial direction. The element 94 constitutes a mechanical protection for the rubber sealing material and is pressed on the shaft so as to rotate therewith.

In FIGS. 9 to 12, there is shown a locking and sealing ring which can be fixed to a cylindrical surface without requiring any groove therein. The locking and sealing ring consists of a locking ring 102 and a sealing ring 104. The locking ring 102, of FIGS. 9 and 10, consists of metal and is fixed to the sealing ring 104 consisting of rubber-like material. The locking ring 102 is provided with projections 106 extending inwards in the radial direction.

Figure 10:
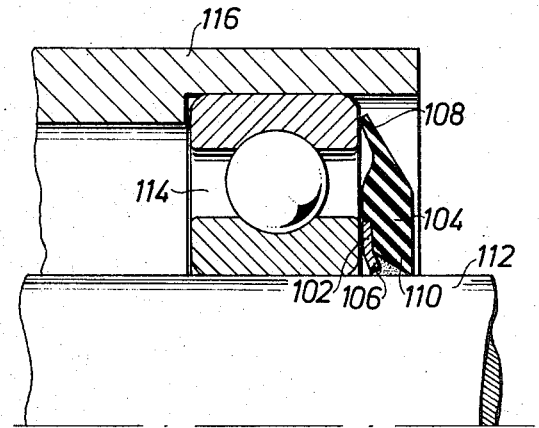
FIG. 10 is a fragmentary sectional view showing a device according to FIG. 9 in position on a shaft.

As shown in FIG. 10, the sealing ring 104 has an outer sealing portion 108 and an inner sealing portion 110. The locking and sealing ring is disposed on a shaft 112 supported in housing 116 by a conventional ball bearing 114. The outer race of the ball bearing is disposed in the housing 116. The locking and sealing ring can be fixed to the shaft in one axial direction without requiring the use of any groove in the shaft by means of the projections 106 merely by pressing the device on the shaft. In the mounted position the locking and sealing ring fixes the shaft in relation to the bearing in one direction. The outer sealing portion 108 contacts the outer race of the bearing 114 and the inner sealing portion 110 contacts the shaft 112.

Figure 11:
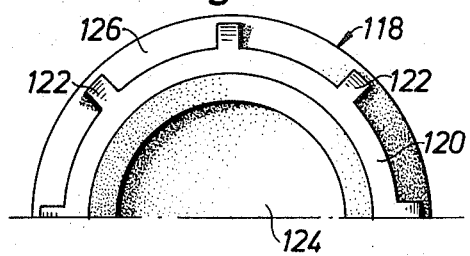
FIG. 11 is a view like FIG. 10 but shows the locking ring element with the circumferentially spaced fingers projecting radially outwardly therefrom.
Figure 12:
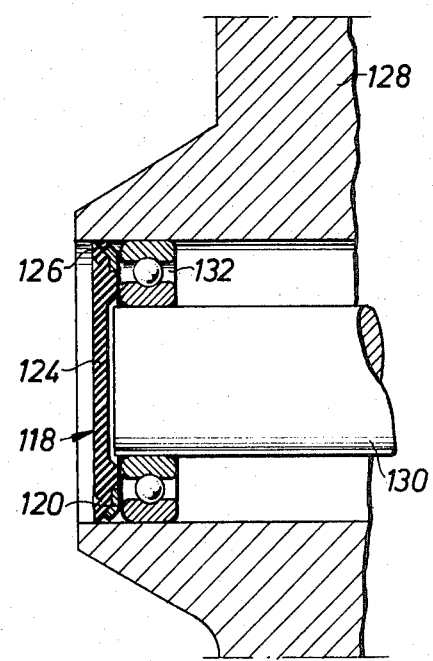
FIG. 12 is a vertical sectional view showing a device according to FIG. 11 in operative position and also showing that the sealing element portion of the device is disc-like so as to close an opening in a housing.

In FIG. 11, there is shown a cap 118 adapted to close a cylindrical opening. The cap comprises a locking ring 120 having radially outward directed projections 122 and a disc 124 fixedly connected with the ring 120 and consisting of rubber-like material. The disc 124 has an inclined peripheral sealing lip 126 separated from the rest of the disc by means of a V-shaped groove.

The cap 118 can be used for closing one end of a through bore in a bearing housing 128 in which a shaft 130 is rotatably mounted by means of a conventional ball bearing 132. The cap is mounted by being pushed into the bore to a position contacting the ball bearing 132. Thereby the projections 122 are somewhat deflected back in the direction opposite the direction in which the cap is pushed into the bearing making it impossible or difficult to withdraw the cap from the bore in the opposite direction. When the cap is pushed into the bearing the sealing lip 126 sealingly contacts the wall of the bore.

The invention can be modified within the scope of the following claims.

What is claimed is:

1. A locking and sealing device for locking and sealing a bearing having an outer ring engaging a cylindrical surface forming an axial bore through a housing, an inner ring engaging a cylindrical surface of a shaft extending through said bore and anti-friction elements disposed between said inner and outer rings, comprising, in combination, a collapsible-expansible metal ring element having a peripheral surface engaging one of said cylindrical surfaces adjacent one of said inner and outer rings and having a radial face engaging an end surface of that ring engaging said one of said cylindrical surfaces for locking said bearing against displacement in one axial direction, and a sealing element of elastic rubber-like material bonded to said metal ring element remote from said peripheral surface and radial face, and in concentric relation to said metal ring and having a first annular portion sealingly engaging said one of said cylindrical surfaces adjacent said metal ring element at the opposite side from said radial face, and a second annular portion at a radial distance from said first annular portion sealingly engaging an end surface of the other of said inner and outer rings engaging the other of said cylindrical surfaces.

2. A locking and sealing device according to claim 1, wherein said second annular portion sealingly engages the other cylindrical surface.

3. A locking and sealing device as claimed in claim 1, wherein said one of said cylindrical surfaces has an annular groove formed therein and said metal ring element is radially split and engages said groove.

4. A locking and sealing device according to claim 1, wherein said metal ring element comprises circumferentially spaced radial fingers having free ends engaging said one of said cylindrical surfaces.

5. A locking and sealing device according to claim 1, wherein said sealing element is in the form of an imperforate disc and is connected near the periphery of said metal ring element.

* * * * *